United States Patent [19]

Pickett

[11] Patent Number: 4,703,950
[45] Date of Patent: Nov. 3, 1987

[54] ELECTRICAL LOCK-OUT MECHANISM FOR DOOR MOUNTED SEAT BELT RETRACTORS

[75] Inventor: David A. Pickett, Roseville, Mich.

[73] Assignee: Allied Corporation, Morris Township, Morris County, N.J.

[21] Appl. No.: 835,410

[22] Filed: Mar. 3, 1986

[51] Int. Cl.$^4$ ............................................. B60R 22/40
[52] U.S. Cl. ............................ 280/806; 242/107.4 A
[58] Field of Search ...................... 280/803, 806, 807; 267/105.4 A

[56] References Cited

U.S. PATENT DOCUMENTS

| | | | |
|---|---|---|---|
| 4,209,186 | 6/1980 | Close | 280/806 |
| 4,280,584 | 7/1981 | Makishima | 280/806 |
| 4,603,819 | 8/1986 | Loose et al. | 280/806 |
| 4,605,180 | 8/1986 | Fisher, III et al. | 242/107.4 A |

Primary Examiner—David M. Mitchell
Assistant Examiner—Karin L. Ferriter
Attorney, Agent, or Firm—Russel C. Wells; Markell Seitzman

[57] ABSTRACT

An electrical lock-out mechanism for a door mounted, vehicle-sensitive, seat belt retractor to prevent the retractor from locking up in response to the normal opening of the vehicle's door. The lock-out mechanism has a lock-out finger attached to either the retractor's lockbar or top to the pawl of a piloted pawl type retractor. A solenoid is positioned adjacent to the free end of the lock-out finger and has a plunger which is displaceable between a retracted and an extended position. An electrical switch responsive to the unlatching of the door's locking mechanism energizes the solenoid to displace the plunger to its extended position to inhibit the displacement of the lock-out finger and the lock-up of the retractor with acceleration below two G's experienced by the retractor's crash sensor when the vehicle's door is normally opened. The lock-out finger is a formed leaf spring permitting the crash sensor to override the lockout at higher levels of acceleration or decelerations, greater than two G's, indicative of actual vehicle crash conditions.

3 Claims, 4 Drawing Figures

ELECTRICAL LOCK-OUT MECHANISM FOR DOOR MOUNTED SEAT BELT RETRACTORS

FIELD OF THE INVENTION

The invention is related to the field of automotive safety restraint systems and in particular to an electrical lock-out for door mounted seat belt retractors to prohibit the retractor from locking up in response to the accelerations experienced when the door is opened under normal condition.

BACKGROUND OF THE INVENTION

In many of the passive safety restraint systems presently being developed for automotive vehicles, it is contemplated to mount vehicle sensitive seat belt retractors in or on the doors. These retractors are responsive to accelerations in any direction as low as 0.7 G's to prohibit the extraction of the webbing from the retractor's spool. Unfortunately, the acceleration of the vehicle's door when it is opened often exceeds this value and will lock-up the retractor preventing the door from being fully opened. To prevent this problem, the prior art teaches the use of cables and/or mechanical linkages to lock-out the retractor's acceleration or crash sensor when the door is open. These cables and mechanical linkages are bulky, costly and require the operator to supply the added energy necessary to lock-out the retractor.

The lock-out actuation is normally provided by a spring loaded plunger producing a mechanical displacement when the door is opened. This is similar to the plunger which releases the retractor's tension relief mechanism when the door is opened permitting the retractor to retract the loose seat belt webbing. These mechanical devices normally require the door to be opened a distance beyond the safety latch position before the retractor is lock-out, otherwise, the retractor would be locked-out when the door is being retained in the closed position by the safety latch. Therefore, the mechanical lock-out devices require a significant opening displacement of the vehicle's door before the retractor is locked-out.

This required initial opening displacement of the vehicle's door is unsatisfactory because accelerations experienced by the door when the seal is broken and before the mechanical plunger is actuated are sufficiently high to lock-up the retractor.

This invention is an electrical lock-out device for door mounted vehicle sensitive seat belt retractors is responsive to the unlatching of the door's mechanical locking mechanism which overcomes the problems discussed above.

SUMMARY OF THE INVENTION

The invention is a lock-out mechanism for disabling a door mounted vehicle sensitive seat belt retractor, during the opening of the door of a vehicle. The retractor may be of any conventional design having a frame, a spool for receiving a length of seat belt webbing, a spool axle rotatably supporting the spool from the frame, a motor for rotating the spool to wind the seat belt webbing thereon, at least one ratchet wheel attached to the spool, a lock-up mechanism including a lock-bar operative to engage the ratchet wheel and inhibit the unwinding of the seat belt webbing from the spool, and a crash sensor for actuating said lock-up mechanism to displace the lock bar into engagement with the ratchet wheel in response to accelerations and decelerations greater than a predetermined value. The lock-out mechanism comprises a lock-out finger having one end attached to the lock-out mechanism and a free end, a solenoid having a plunger displaceable between an extended position and a retracted position and means for energizing the solenoid in response to the unlatching of the doors locking mechanism, to displace the plunger to the extended position. In the extended position, the plunger prohibits the displacement of the free end of the lock-out finger which disables the retractor's lock-up mechanism during the opening of the vehicle's door. In the preferred embodiment, the lock-out finger is a leaf spring which permits the crash sensor to override the lock-out mechanism in response to crash conditions making the systems fail safe.

It is a principle advantage of the invention for the lock-up mechanism of a door mounted vehicle sensitive seat belt retractor to be disabled during the period when the door is being opened thereby permitting the seat belt webbing to be freely extracted from the retractor. Another advantage is that the lock-out mechanism is overridden by the crash sensor under actual crash conditions making the lock-out mechanism fail safe. These and other advantages of the lock-out mechanism will become more apparent from reading the specification in conjunction with the drawings.

DETAILED DESCRIPTION OF THE INVENTION

Figure 1:
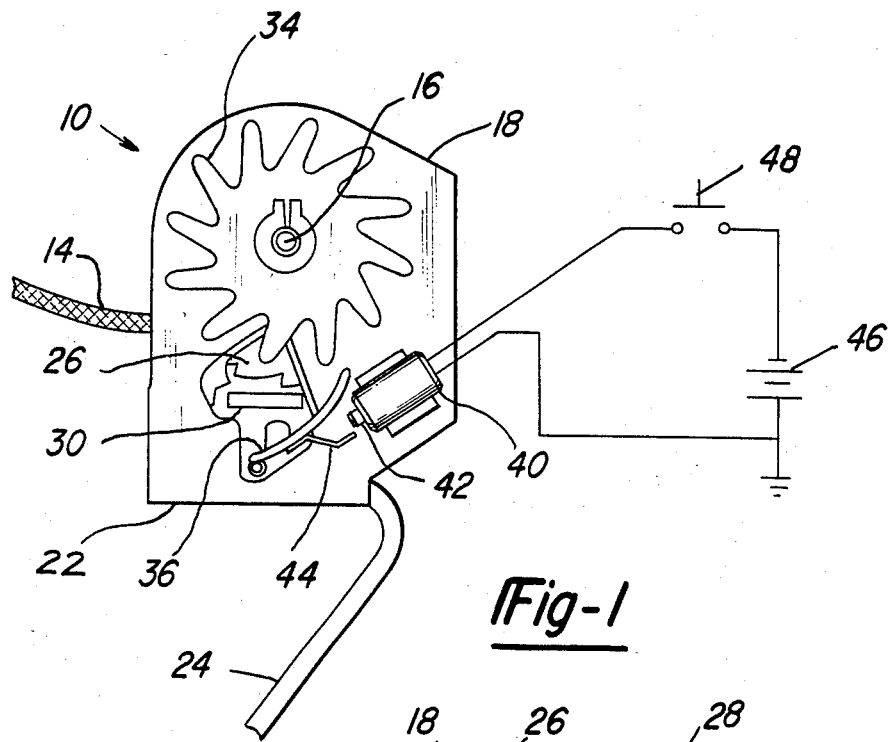
FIG. 1 is a side view of a piloted pawl seat belt retractor with the solenoid's plunger retracted.
Figure 2:
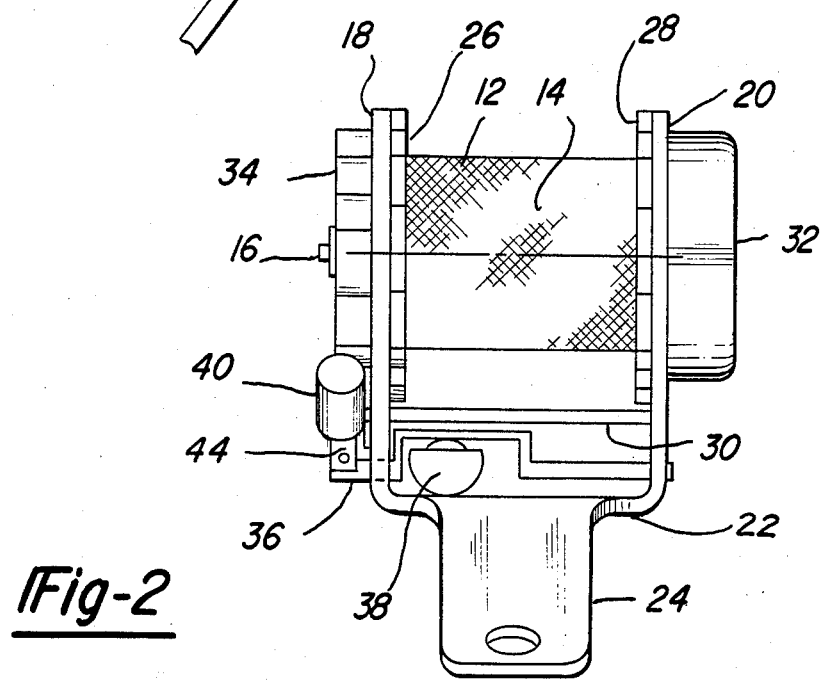
FIG. 2 is a front view of the seat belt retractor of FIG. 1.
Figure 3:
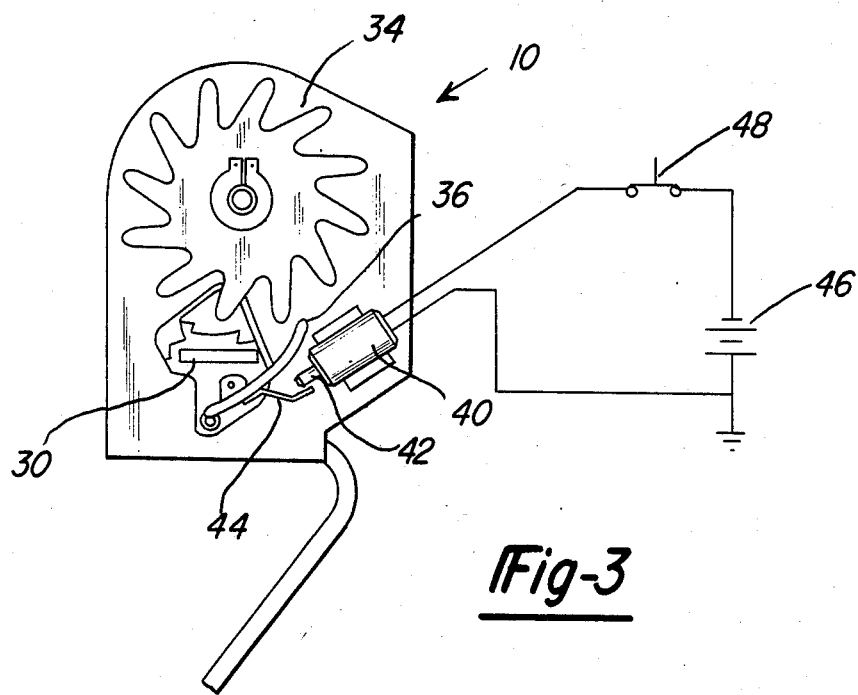
FIG. 3 is a side view of the piloted pawl seat belt retractor with the solenoid's plunger extended.

The electric lock-out mechanism for door mounted seat belt retractors will be initially discussed relative to a piloted pawl type seat belt retractor of the type illustrated in FIGS. 1—3 but is equally applicable to other types of seat belt retractors. Referring first to FIGS. 1 and 2, there is shown a piloted pawl seat belt retractor 10 of a conventional design. The retractor 10 has a spool 12 on which is wound a length of seat belt webbing 14. The spool 12 is rotatably supported by an axle 16 between two upstanding end plates 18 and 20 of a "U" shaped frame 22. The frame 22 has a mounting tongue 24 for securing the retractor 10 to a frame member such as a door.

A pair of ratchet wheels 26 and 28 are provided at the opposite ends of spool 12 which are engageable by a lock bar 30 pivotally suspended between the end plates 18 and 20. A motor 32 which may be a conventional spring motor or an electric motor, is operative to rotate the spool 12 in a direction to wind the seat belt webbing 14 thereon.

A ratchet wheel 34 is fixedly attached to the axle 16 and will rotate with the spool 12. A piloted pawl 36 is pivotably attached to the end plates 18 and 20 is operative to be displaced into engagement with the teeth of the ratchet wheel 34 by a crash sensor 38 attached to the frame 22. The crash sensor 38 may be of any known type which produces a mechanical motion or mechanical displacement of the pawl 36 in response to an acceleration or deceleration greater than a predetermined value. In a conventional piloted pawl retractor the crash sensor 38 will displace the pawl 36 into engagement with the teeth of the ratchet wheel 34 in response to an acceleration or deceleration of approximately 0.7 G's.

When the pawl 36 is engaged with the teeth of the spur gear 34, any forces on the seat belt webbing 14 tending to unwind the webbing from the spool 12 will rotate the ratchet wheel 34 in a clockwise direction. The clockwise rotation of the ratchet wheel 34 will further displace the pawl 36 to engage and lift the lock-bar 30 into engagement with the teeth of ratchet wheels 26 and 28. The engagement of the lock-bar 30 with the teeth of the ratchet wheels 26 and 28 locks rotation of the spool 12 prohibiting further extraction or unwinding of the seat beat webbing 14.

The electrical lock-out mechanism comprises a solenoid 40 having a spring loaded plunger 42 displaceable between a retracted and an extended position and a lock-out finger such as formed leaf spring 44 attached to the pawl 36.

In the unactuated state of solenoid 40, the spring loaded plunger 42 is retracted out of the path of the free end of the leaf spring 44 as shown in FIG. 1, permitting the piloted pawl retractor 10 to operate in a normal manner as described above. However, when the solenoid 40 is energized, the plunger 42 is extended as shown in FIG. 3, and will inhibit any upward displacement of the free end of the leaf spring 44. This will further inhibit the movement of the pawl 36 into engagement with the ratchet wheel 34.

The spring rate of the leaf spring 44 is selected so that it will prevent the crash sensor 38 from displacing the pawl 36 into engagement with the ratchet wheel 34 when subjected to the normal accelerations associated with the the opening of the vehicle's door. Nominally, the spring rate of the leaf spring 44 is selected to inhibit the pawl 36 from being displaced by the crash sensor 38 into engagement with the ratchet wheel 34 for door accelerations up to two G's. For accelerations beyond two G's the forces generated by the crash sensor 38 will be sufficient to deflect the leaf spring 44 a distance sufficient permitting the pawl 36 to engage the ratchet wheel 34. This provides a fail safe feature, such that the safety restraint system remains capable of providing crash protection to the occupant of the motor vehicle in the event the solenoid 40 fails with the plunger 42 in the extended position.

Power to the solenoid 40 is supplied from the vehicle's source of electrical power illustrated as a battery 46 through an electrical switch 48. The electrical switch 48 is actuated by the door's latching mechanism, not shown, being displaced to the open state so that the solenoid 40 is energized the moment the door is unlatched. Thus, the retractor is locked out prior to experiencing any accelerations associated with the opening or closing of the vehicle's door. As is known in the art, the door's latching mechanism will remain in the open state until the vehicle's door is closed, at which time the door's latching mechanism returns to the latched state, opening the switch 48.

Figure 4:
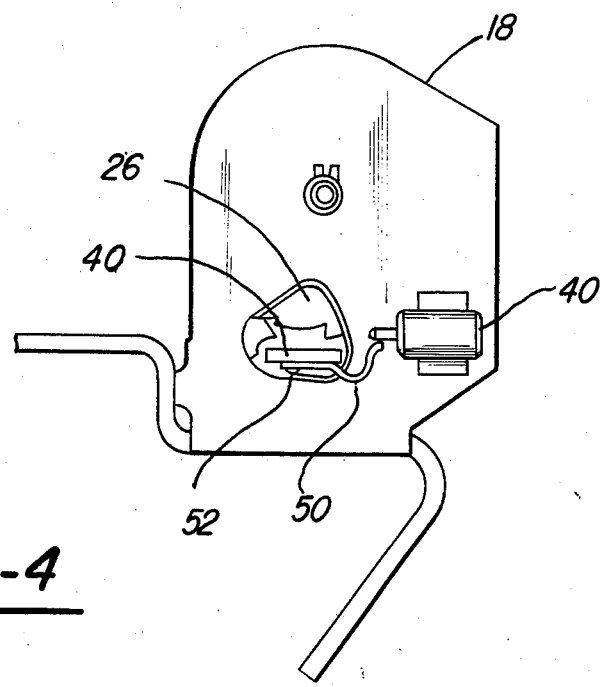
FIG. 4 is a side view of another embodiment of the lock-out mechanism.

FIG. 4 shows the lock-out mechanism mounted on a conventional seat belt retractor. In this embodiment a leaf spring 50 is attached directly to the lock-bar 30 by a screw or rivet 52. The spring 50 is contoured so that the crash sensor 38 is capable of displacing the lock-bar 30 into engagement with the teeth on ratchet wheels 26 and 28 due to accelerations or decelerations greater than two G's. The solenoid 40 will engage the end of the spring 50 when it is actuated by unlatching the door's locking mechanism. The solenoid 40 is actuated by the closing of an electrical switch such as the switch 48 illustrated in FIGS. 1 and 3. In the unactuated state of the solenoid 40, the plunger 42 is retracted a distance sufficient to clear the spring 50 permitting unrestricted displacement of the lock-bar 30 by the crash sensor.

In both embodiments of the lock-bar mechanism, the solenoid is not required to do any work other than to extend the plunger into the path of the leaf springs 44, 50. The forces applied to the solenoid's plunger are transverse to the plunger's direction of motion, therefore, the solenoid does not exert any effort or force restraining the displacement of the pawl 36 or the lock-bar 30 by the crash sensor. Because the solenoid 40 is not required to do any work it may be made relatively small, have a very low electrical power requirement and, therefore, have high reliability.

It is not intended that the lock-out mechanism be limited to the embodiments shown and discussed in the specification. It is recognized that one skilled in the art may make changes or alterations without departing from the spirit of the invention described above and set forth in the appended claims.

What is claimed:

1. An electrical lock-out mechanism for vehicle door mounted seat belt retractors having a frame, a spool for winding a length of seat belt thereon, a spool axle for rotatably supporting said spool on the frame, at least one ratchet wheel attached to the spool, a lock-bar pivotally supported from the frame and pivotable from a rest position to an actuated position for engaging the teeth on the at least one ratchet wheel, another ratchet wheel rotatably attached to said spool axle, a pawl pivotably supported from the frame for engaging the another ratchet wheel and pivoting the lock-bar to the actuated position, a crash sensor operable for pivoting the pawl in response to acceleration forces indicating a crash condition, said mechanism comprising:

switch means responsive to the unlatching of the vehicle door lock;

a solenoid having a plunger moveable in response to said switch means for inhibiting the pawl from engagement with the another ratchet wheel; and a leaf spring having one end attached to the pawl and a free end engageable by said plunger for restricting the movement of the pawl in response to normal acceleration forces created by the opening of a vehicle door and deflectable in response to acceleration forces indicating a crash condition for pivoting the pawl into engagement with the another ratchet wheel.

2. The door mounted seat belt retractor of claim 1 wherein said leaf spring has a spring rate selected to enable the pawl to engage the another ratchet wheel in response to acceleration forces being greater than said normal acceleration forces generated by the opening of the vehicle's door under normal operating conditions.

3. The door mounted seat belt retractor of claim 2 wherein said acceleration forces are greater than two G's.

* * * * *